(12) United States Patent
Lavery et al.

(10) Patent No.: US 6,439,795 B1
(45) Date of Patent: Aug. 27, 2002

(54) BALL JOINT COVER

(75) Inventors: Gillian Lavery; Roger Jones; D. J. Scott Barrett, all of Rugby; Daljit Ohbi, Luton; Theresa de la Fuente, Harpole, all of (GB); George Schmidt, St. Louis, MO (US)

(73) Assignee: Federal-Mogul Technology Limited, Rugby (GB)

(*) Notice: Subject to any disclaimer, the term of this patent is extended or adjusted under 35 U.S.C. 154(b) by 0 days.

(21) Appl. No.: 09/742,863

(22) Filed: Dec. 20, 2000

(51) Int. Cl.[7] .............................................. F16C 11/06
(52) U.S. Cl. ...................... 403/134; 403/133; 403/122; 403/50; 464/173
(58) Field of Search ................................ 403/120, 122, 403/133, 134, 50, 51; 464/173, 175

(56) References Cited

U.S. PATENT DOCUMENTS

| | | | | | |
|---|---|---|---|---|---|
| 2,544,541 A | * | 3/1951 | McCarthy | ..................... | 403/50 |
| 3,357,728 A | * | 12/1967 | Melton et al. | ............... | 403/134 |
| 3,539,234 A | * | 11/1970 | Rapata | ........................ | 403/122 |
| 5,074,697 A | * | 12/1991 | Blanpain et al. | .............. | 403/50 |
| 6,083,109 A | * | 7/2000 | Gerulski | ..................... | 464/175 |

FOREIGN PATENT DOCUMENTS

| CA | C-588460 | * 12/1959 | ................... | 403/50 |
|---|---|---|---|---|

* cited by examiner

Primary Examiner—Lynne H. Browne
Assistant Examiner—Michael P. Ferguson
(74) Attorney, Agent, or Firm—Polster, Lieder, Woodruff & Lucchesi, L.C.

(57) ABSTRACT

A ball joint 110 for a vehicle having a housing 120 partly enclosing a ball member 112 a cover member 150 provided by an annular, partially everted body of steel which at one end 158 surrounds the housing for attachment and at the other 156 is in-turned at 160 to approach the spherical surface 118 of the ball member radially and at about 45 degrees to the member housing axis. This other end 156 supports an elastomeric sealing ring 142 biased by the member 150 against the spherical surface to prevent contaminants being carried by the ball to the housing seat 126. To tailor the resilience, the cover member is provided with an array of slots $168_1$ ... at the curved region 160 which are filled with plugs $172_1$ ... of contaminant excluding elastomer and/or the ball sealing ring is biased against the housing adjacent the seat.

31 Claims, 6 Drawing Sheets

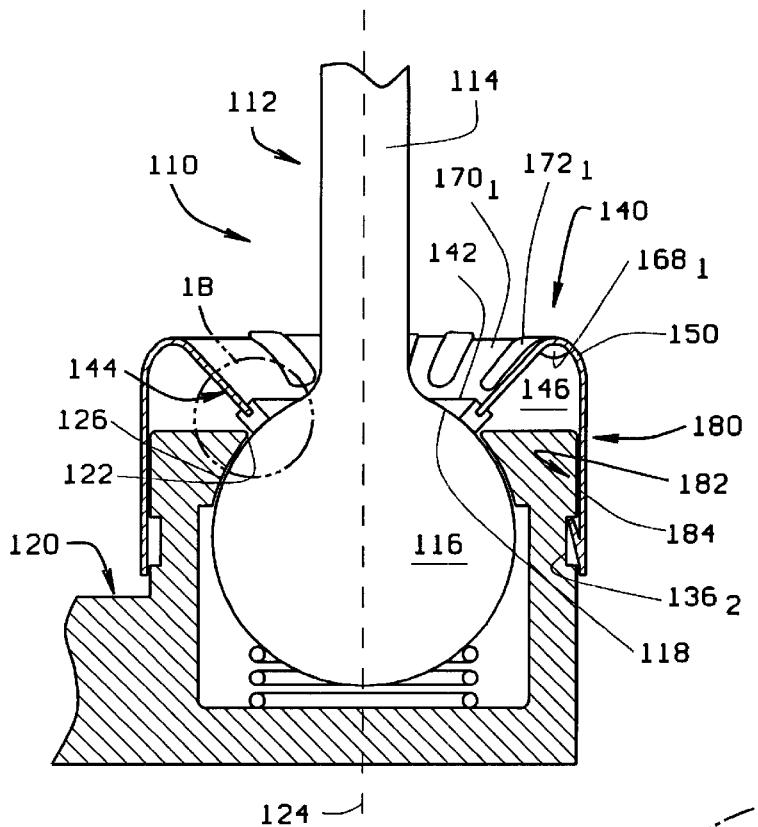
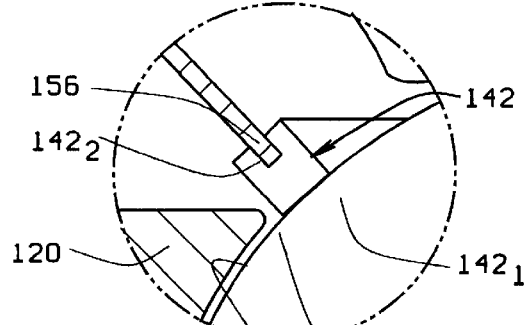
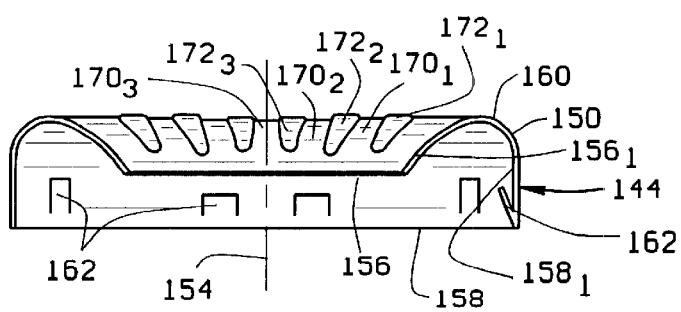
FIG. 1A
FIG. 1B
FIG. 1C

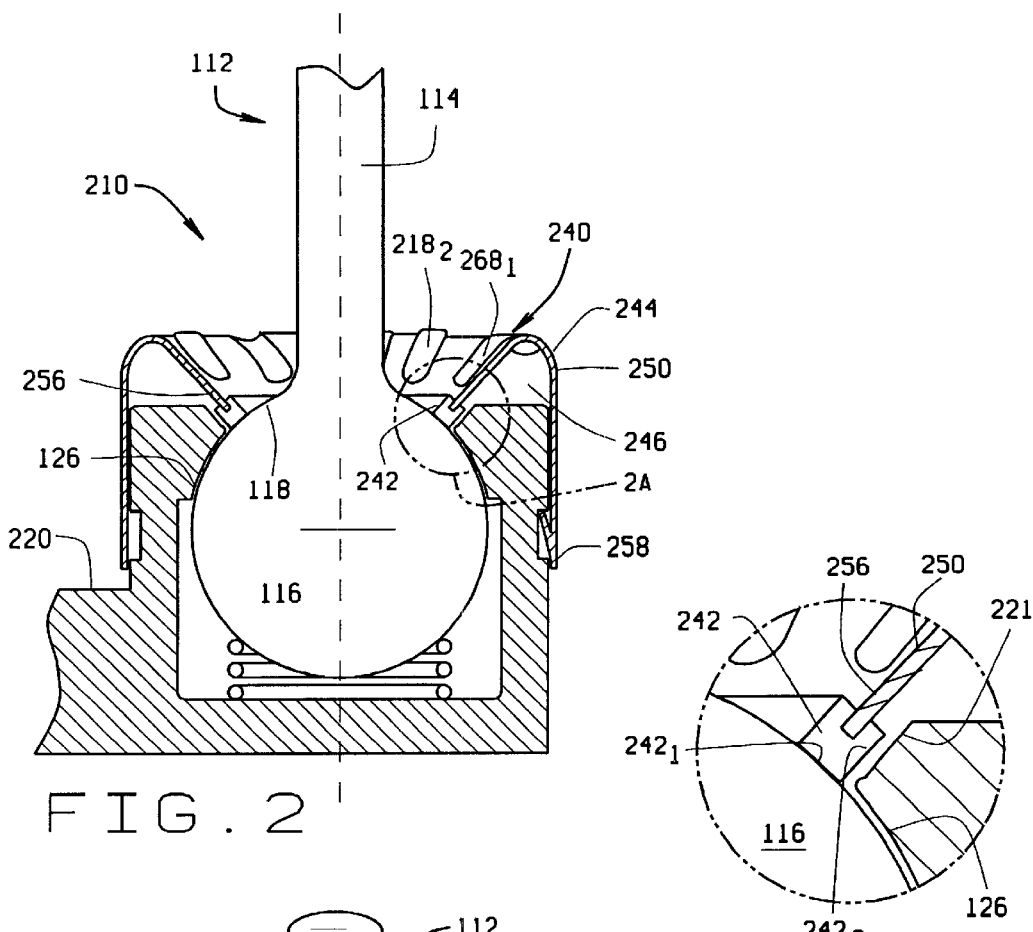
FIG. 2
FIG. 2A
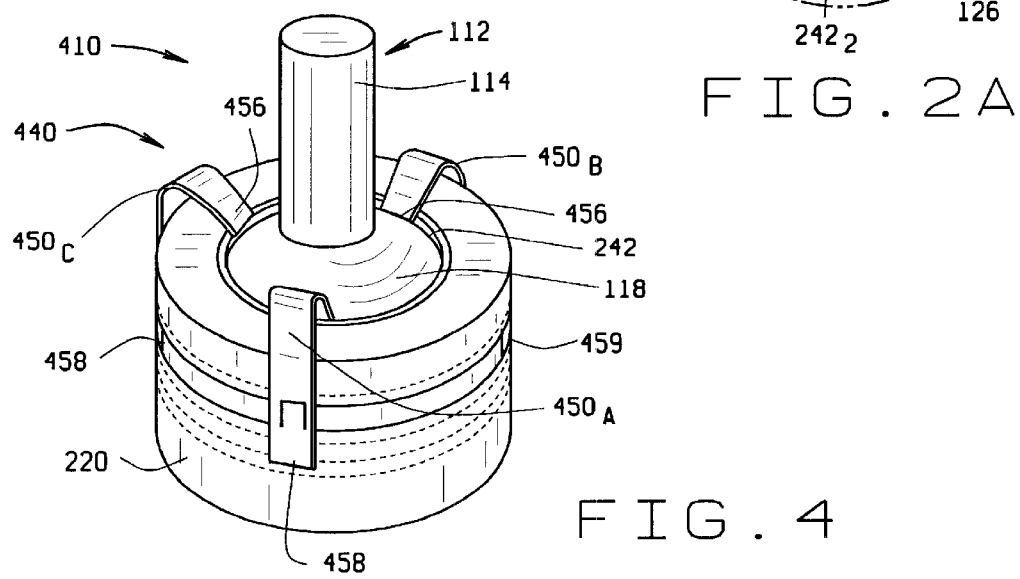
FIG. 4

BALL JOINT COVER

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to ball joints between two members, particularly of the type used in vehicle steering or suspension arrangements, and more particularly relates to cover means for preventing the ingress of contaminants to co-operating surfaces thereof.

Ball joints between members wherein forces are transmitted between the members whilst permitting relative articulation are to be found in steering systems of vehicles, and in general terms consist of three parts; (1) a ball member having an end portion that has a spherical curvature facing along the member from the end portion; (2) a housing member, comprising a container for at least part of the end portion of the ball member, having an aperture surrounding a longitudinal axis thereof to permit passage of the uncontained part of the ball member and provide a seat for the spherically curved surface; and (3) cover means, in the form of a generally tubular elastomeric (typically rubber) gaiter or boot which is attached at its ends surrounding to the housing member and the ball member so as to enclose that part of the spherical surface of the ball member end that is instantaneously, outside of the housing member, the flexibility of the gaiter permitting pivoting of the member with respect to the housing axis such that the spherical surface moves by way of the seat between the housing and the region enclosed within the gaiter.

Whereas the gaiter satisfactorily inhibits collection of contaminants on the spherically curved surface and ingress to the housing by way of the seat as the surface pivots, the presence of such a gaiter imposes constraints upon the functionality of the joint.

For instance, the angle through which the ball member can pivot is constrained by the stretching and puckering of the gaiter and siting of such a ball joint arrangement is constrained by a tendency for the gaiter material to perish prematurely when continuously operated exposed to heat radiated by a vehicle part such as an exhaust system or brake disc.

It is known to reinforce such an elastomeric gaiter with a steel reinforcement, primarily against physical damage. Such reinforcement may serve to conduct heat from within the gaiter material, but insofar as such heat is initially absorbed by the gaiter material, gaiter reinforcement provides no solution to premature perishing and may act to impede pivoting of the ball member.

The effects of radiated heat upon a ball joint arrangement of a vehicle steering system has been addressed in U.S. Pat. No. 6,095,712 which proposes interposing a heat shield between the heat source and the ball joint gaiter. Insofar as the shield comprises an additional component to manufacture and install, its shape is dependant upon the detailed design of the steering system and its disposition with respect to any heat source, militating against interchangeability between arrangements; that is, it is not multi-use component. Furthermore such a shield does not address any shortcomings in the range of ball member movements permitted by the elastomeric gaiter.

BRIEF SUMMARY OF THE INVENTION

It is an object of the present invention to provide for a ball joint arrangement with a ball member having a spherical surface that moves within and without a housing member containing a seat, cover means for the prevention of contaminant ingress to the seat that is of simple construction and permits greater range of movement within the ball joint arrangement and greater protection from nearby heat sources than hitherto. It is also an object of the present invention to provide a ball joint arrangement including such a cover.

Briefly stated, according to a first aspect of the present invention, for a ball joint arrangement comprising a ball member, having an end portion that has a spherical curvature facing along the member from the end portion, and a housing member, comprising a container for at least part of the end portion of the ball member and an aperture surrounding a longitudinal axis thereof to permit passage of the uncontained part of the ball member and provide a seat for the spherical surface thereof, a ball joint cover which is operable to prevent ingress of contaminants to the seat comprises a ball seal arranged to extend around the longitudinal axis of the housing member as a ball sealing ring, the carrier adapted to be attached to the housing member operable to support the ball sealing ring biased against the spherical surface of the ball member without the housing such that said surface can slide relative to the sealing ring, and define a cover region between the carrier and the housing member, and barrier operable to inhibit ingress of contaminants to the seat from the cover region.

According to a second aspect of the present invention, a ball joint arrangement comprises a ball member, having an end portion that has a spherical curvature facing along the member from the end portion, a housing member, comprising a container for at least part of the end portion of the ball member, having an aperture surrounding a longitudinal axis thereof to permit passage of the uncontained part of the ball member and provide a seat for the spherical surface thereof, and a ball joint cover as defined in the preceding paragraph.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1(a) is a sectional elevation through a ball joint arrangement including novel cover in accordance with a first embodiment of the present invention, the ball joint arrangement consisting of a ball member including a spherically curved end region, a housing member containing part of the curved end region supported by a correspondingly curved seat, the cover including a ball sealing ring and carrier for the sealing ring attached to the housing member to bias the sealing ring against the ball member displaced from the housing, the cover comprising an annular unitary carrier member and comprising a barrier in which the carrier defines a sealed cover region adjacent the housing inboard of the sealing ring;

FIG. 1(b) is an enlargement of the encircled part of FIG. 1(a) illustrating in greater detail the support relationship between the ball sealing ring and carrier member;

FIG. 1(c) is a sectional elevation through the carrier of FIG. 1(a), showing the annular unitary carrier member in the shape of a partially everted tubular body having an array of through-apertures to increase its resilience, the apertures being plugged by a high temperature resistant material;

FIG. 2 is a sectional elevation through a ball joint arrangement including a cover in accordance with a second embodiment of the present invention, including a carrier member is similar to that of FIGS. 1(c) and 1(d) but wherein the through-apertures are open to the passage of material therethrough and the barrier is defined by the ball sealing ring also abutting the housing to provide a barrier to the ingress of contaminants;

FIG. 2(a) is an enlargement of the encircled part of the FIG. 2;

FIG. 4 is a perspective view of a ball joint arrangement including a cover in accordance with a fourth embodiment of present invention in which, as a modification to the embodiment of FIG. 2, the cover includes a carrier in the form of discrete carrier members attached to the housing member and supporting a ball sealing ring biased against both the ball member and the housing to effect a barrier;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 7:
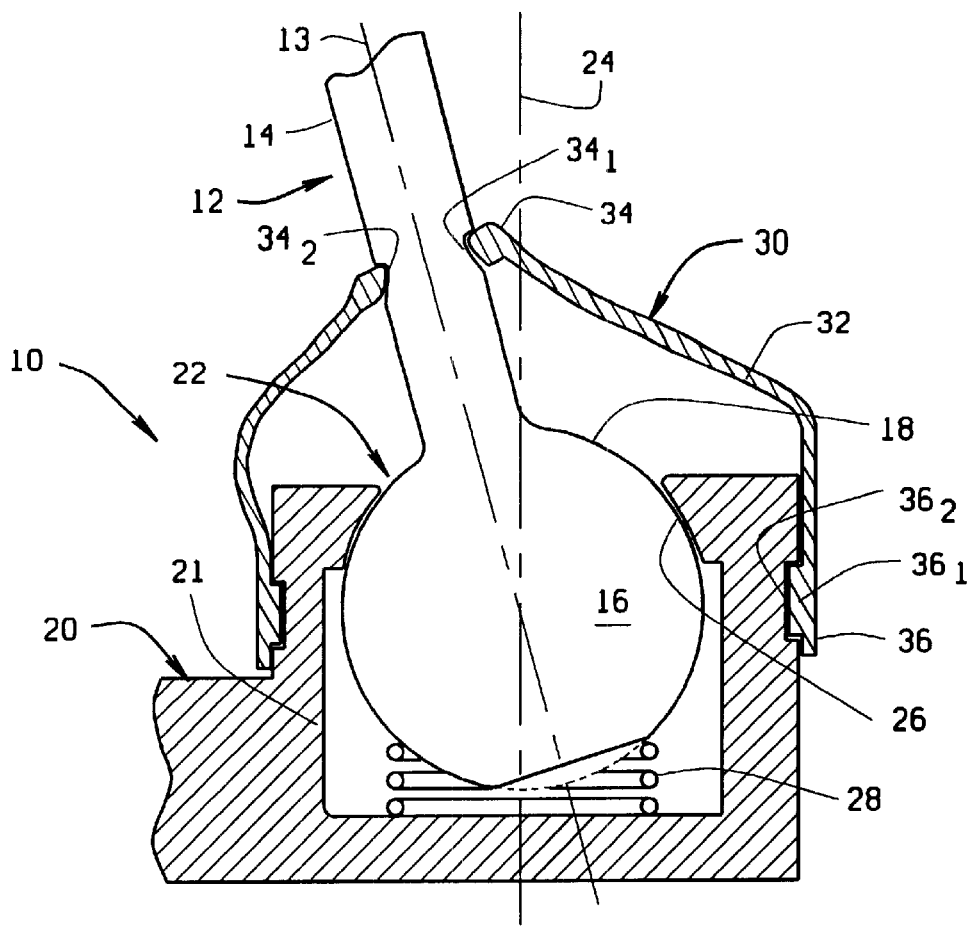
FIG. 7 is a sectional elevation through a known form of ball joint arrangement consisting of a ball member including a spherically curved end region, a housing member containing part of the curved end region supported by a correspondingly curved seat and cover in the form of a rubber gaiter for protecting the end region and preventing ingress of contaminants to the housing seat.

Referring firstly to FIG. 7, this shows in sectional elevation a known form of ball joint arrangement 10 as used within a vehicle steering system. A brief description is given here to assist in understanding the present invention.

The ball joint arrangement 10 comprises a ball member 12 which is rotationally symmetrical about a longitudinal axis 13 thereof, having a shaft or stud portion 14 and an end portion 16 in the form of a partial sphere, but nevertheless with a surface part 18 of spherical curvature facing along the member from the end portion. The ball member is associated with a housing member 20 comprising a container 21 for part of the end portion 16 of the ball member. The housing has an aperture 22 surrounding a longitudinal axis 24 to permit passage of the uncontained part of the ball member and provide, by corresponding spherical curvature surrounding the aperture, a seat 26 for the spherical surface of that member. A spring 28 within the container extends between the housing and the end of the ball member to bias the spherical surface against the seat, permitting the ball member to pivot relative to the longitudinal axis 24 without any significant lateral or axial relative movements. The container 21 defined by the housing is normally packed with a lubricant to facilitate sliding movements between ball member and housing.

It will be appreciated that at any instant a major part of the spherical surface of the ball member is contained within the housing and a minor part without, but that as the ball member pivots with respect to the housing portions of the spherical surface interchange between being within and without the housing by way of the seat and such motion can potentially result in contaminants on this surface being drawn into the container and inflicting damage on the seat and the spherical surface of the ball member, exacerbated by such pivoting carrying lubricant from the seat coated on the spherical surface for contaminant entrapment.

A cover 30 is provided to prevent the ingress of contaminants and takes the form of a shaped, tubular gaiter or boot 32 of rubber or similar elastomer which extends between the housing member and the ball member and totally encloses the end portion 16 of the ball member without the housing member. The gaiter is attached to the ball member at one end 34 and to the housing at the other end 36, the resilience of the material causing beads $34_1$ and $36_1$ at the ends to locate within co-operating grooves $34_2$ and $36_2$. As outlined above the use of such an elastomeric gaiter is to some extent limiting in respect of the angle through which the ball member can pivot relative to the housing, but also limits permissible long term exposure to radiant heat from other vehicle components and thus siting of the ball joint arrangement.

Referring now to FIGS. 1(a) to 1(d), a ball joint arrangement including a cover in accordance with a first embodiment of the present invention is indicated generally at 110. Insofar as many parts are directly comparable with the ball joint arrangement 10 these are given similar reference numbers prefixed by "1", that is, the arrangement comprises ball member 112, having end portion 116 that has spherically curved surface 118, and housing member 120 which has aperture 122 defined by longitudinal axis 124 and surrounded by spherical seat 126 by which part of the ball member end portion is retained and relative to which the spherical surface 118 can move into and out of the housing. The housing member also has circumferentially extending recess means 136₂ corresponding to groove 36₂ hitherto employed to attach an elastomeric gaiter.

In accordance with the invention there is provided a cover, indicated generally at 140, which is not only operative to prevent ingress of contaminants to the seat but also to facilitate an improved deflection range for the ball member and operation proximate to sources of radiant heat.

"The cover 140 comprises a ball seal in the form of a ball sealing ring 142 that is adapted to extend around a path in the spherical surface of the ball end portion without the housing and be supported biased against the spherical surface in sliding relationship by carrier means 144 attached to the housing member, in which a carrier also defines a cover region 146 between the carrier and the housing member. The cover 140 also comprises a barrier, indicated generally at 180, operable to inhibit ingress of contaminants to the seat 126 from this cover region and described in greater detail hereinafter."

The carrier 144 comprises a unitary carrier member 150 comprising an annular body formed of a material that is resilient and generally laminar, preferably a heat resistant material such as steel, and most conveniently spring steel, taking the shape of a tubular body generated about a longitudinal axis 154 which, to distinguish from the longitudinal axis of the housing member or ball member, shall herein be referred to as the "tube axis". The tubular body shape is, furthermore, everted (or looked at alternatively, inturned or inverted) for part of its tubular length between a sealing ring supporting end 156, hereinafter simply called "the supporting end", and a housing attachment end 158.

In the vicinity of the housing attachment end 158 and the supporting end 156, the end regions 158₁ and 156₁ of the body extend substantially linearly and are connected by a region 160 of longitudinal curvature, that is, relative to the tubular axis 154 as well as around it, having a curvature of substantially constant radius R.

The end region 158₁ of the carrier member body extends substantially parallel to the tubular axis 154 and is dimensioned to surround the housing member and overlie the groove 136₂ therein. This region 158₁, which may also be considered an attachment region, also carries attachment means in the form of an array of punched barbs 162 which facilitate positioning of the carrier member over the end of the body by simple pushing until the barbs locate within the groove but resist forces tending to remove it thereafter.

The extent of this attachment region 158₁ is also chosen such that the curved region 160 is clear of the end of the housing, and the other end region 156₁ of the carrier member body extends inclined with respect to the tubular axis and forms the locus of a ball member opening 164 displaced axially from the attachment end, the preferred inclination being in the range 30° to 60° to the tube axis but more preferably about 45°.

As best seen in FIG. 1(b), the ball sealing ring 142 comprises a ring of elastomeric material having a wiper face 142₁ arranged to bear against the spherical surface of the ball member, and opposite thereto a circumferentially extending slit 142₂ by which it is secured to the carrier member by engaging the end 156 into the slit. The interface between them may be bonded if desired or rely upon friction and mounting forces, thereby facilitating easy replacement. In this embodiment the elastomeric material is a heat resistant elastomer, such as hydrogenated nitrile rubber or flubrelastomer.

The dimensions of the carrier member are chosen with respect to the dimensions of the housing and the spherically surfaced end portion of the ball member such that when the carrier member is attached to the housing the sealing ring is displaced slightly with respect thereto by the spherical surface 118 to extend substantially orthogonally with respect to the spherical surface 118 of the ball member and define in the carrier member a desired level of bias of the sealing ring on the surface. Preferably, the level of bias is low enough to permit rotational displacement of the spherical surface relative to the sealing ring without erosion of the ring material but high enough for the ring to wipe contaminants adhering to the spherical surface therefrom and prevent contaminant particles, or asperities of the surface itself, lifting the seal from contact.

It has been found that for a typical ball joint arrangement a bias force of about 11.24 pounds (50 Newtons) exerted by an attached carrier member is suitable for a variety of ball joint dimensions and accommodating manufacturing tolerances in respect of the carrier member, housing member and ball member that may effect departure from the nominal value.

It will be appreciated that in a typical vehicular steering ball joint the overall diameter of the carrier member may be of the order of 2 inches (50 mm) and that a carrier member body formed of steel will have considerable lack of resilience between its ends 156 and 158 unless the laminar, or wall, thickness is very small.

To achieve the preferred bias force, the carrier member 150 has in the region of longitudinal curvature 160 and at each of a plurality of positions 166₁, 166₂ . . . arrayed about the tubular axis 154, at least one through-aperture 168₁, 168₂ . . . , in this embodiment each in the form of a slot extending in the direction between the end regions of the carrier member. The slots are tapered in width as a function of distance between the end regions, that is circumferentially of the member as a function of distance from the tubular axis, and define therebetween an array of discrete spoke regions 170₁, 170₂ . . . , of substantially uniform width.

Insofar as the carrier member is a unitary body, the slots do not extend to the ends of the carrier member and at each opposing slot end is defined a constant, if different, radius of curvature. The spoke regions 170₁, 170₂ . . . between the slots are thus conjoined at the attachment end 158 of the carrier member and at the supporting end 156.

The through-apertures increase the resilience of the carrier member, but also, possibly, provide contaminant access to the cover region 146 which is between the ball sealing ring and the housing member.

To prevent contaminants from entering the cover region 146 by way of the carrier member, a barrier 180 is provided comprising the carrier member 150, which is made impervious to the passage of contaminants by way of the through-apertures, and a housing seal indicated generally at 182 defined between the housing member and the attachment end of the carrier member.

The carrier slots 168₁, 168₂ . . . are filled with plugs 172₁, 172₂ . . . of a suitable contaminant impervious material, conveniently an elastomer such as silicone rubber which can deflect with the carrier member without significantly affecting the resilience, or spring stiffness thereof. The housing seal 182 is formed by gasket seal 184 of any material capable of excluding contaminants in the operating environments, which includes the aforementioned elastomeric materials, although it does not require to possess the particular properties thereof. However, depending upon the precise form of attachment and how tightly the carrier member grips the housing member, it may be possible to omit the gasket seal and effect the housing seal merely by way of abutment between the carrier member and the housing member.

It will be seen that insofar as the cover comprises both a barrier and extends to the spherical surface of the ball member adjacent the aperture in the housing member, and engages with the ball member by way only of the sliding contact of the ball sealing ring, the ball member is able to pivot relative to the housing to the extent defined by the dimensions of the carrier member and not limited as by a rubber gaiter.

A cover in accordance with the present invention does however expose the spherical surface of the ball member to contaminants and if the normal surface treatment that provides hardening for contact with the seat 126 does not provide contaminant resistance, the spherical surface may be given further surface treatment, such as by nitro-carburising and oxidation or by laser treatment that makes it corrosion resistant by surface modification or provided with a separate coating of corrosion resistant material chrome plating, phosphating or composite organic coating.

"To make the ball joint arrangement suited to exposure to a source of radiant heat, the ball sealing ring and elastomeric slot filling plugs may be formed of materials capable of operating at elevated temperatures without detriment and/or coated with a heat reflective film, the metal of the carrier member not being susceptible to heat damage. In a vehicular environment a temperature of 140 degrees Celsius should be tolerable by the material and the above mentioned materials of this embodiment are chosen with such temperature tolerance in mind."

However it is believed advantageous to avoid the absorption of heat by the ball joint as a whole, particularly in respect of the lubricant therein, and to this end it is preferred to make the carrier member as a whole significantly reflective of heat by exposing the metal thereof. As an alternative to exposing the metal of the carrier member as a radiant heat reflector and plugging the individual slots $168_1$, $168_2$ . . . , the whole of the surface (and possibly both surfaces) of the carrier member may be coated with an elastomeric material which also plugs the slots, and the surface coating itself provided with a heat reflecting film. It will be appreciated that such an elastomeric coating to the carrier member may also form the ball sealing ring at the supporting end of the member.

Furthermore, it will be appreciated that if the ball joint arrangement is intended for use with only a small part of the cover member exposed to a directional heat source, such heat reflective properties may be confined thereto.

Although it is intended that the carrier member should reflect radiant heat rather than absorb it, it may also be made to dispose of heat that is absorbed by way of conduction through the housing member if it is attached by way of a thermally conductive interface, either in by metal-to-metal clamping and/or by way of thermally conductive housing seal 182.

Insofar as the carrier member 150 is required to support the ball sealing ring and exert a modest bias force thereon when subject to deflection upon attachment, and to re-direct radiant heat, it may be formed of any suitably resilient metal or of a material other than metal, such as a engineering thermoplastics material or fibre reinforced composite material that is given the shape of said everted or inturned tubular body by deformation of a tubular body or directly moulded or machined into such shape. Depending upon the material of the carrier member it may be unnecessary to have through-apertures to increase the resilience. It will, of course, be understood that the carrier member when formed of metal may be given the above described shape other than by everting or inturning a tubular body.

Notwithstanding the form and material of the carrier member, it may be attached to the housing other than by integral barbs, such as being clamped thereto by a surrounding band.

Figure 1D:
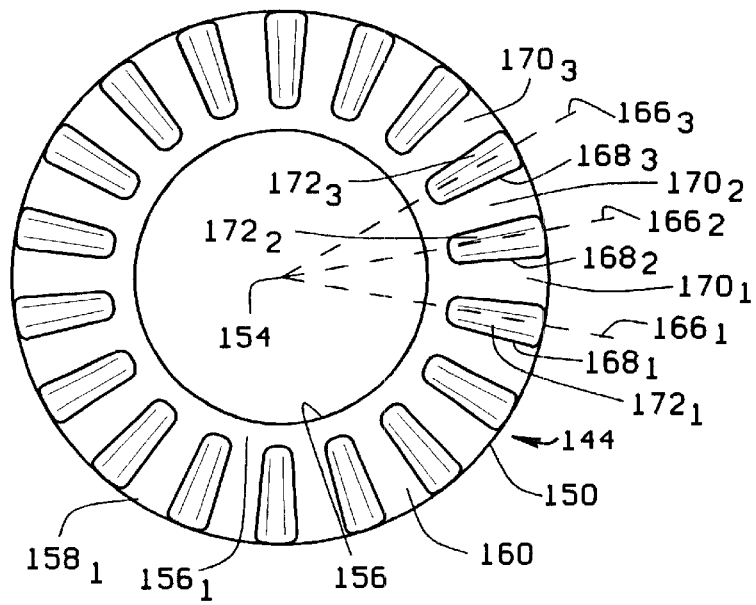
FIG. 1(d) a plan or axial end view of the carrier of FIG. 1(c)
Figure 1E:
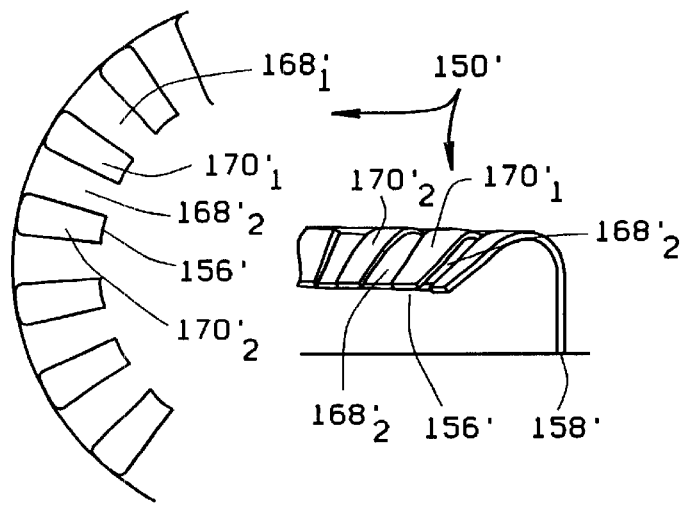
FIG. 1(e) is a composite view, similar to the views of FIGS. 1(c) and 1(d), of a modified form of the carrier member in which the through apertures extend to the ball sealing ring supporting end of the member.

Also it will be appreciated that the through-apertures in the carrier member, if of the form of elongate slots, may vary in width differently, or not at all, to effect width variations in the spoke regions and may be other than elongate slots, such as a line of circular holes. Referring also to FIG. 1(e), which shows a modification of carrier member 150, the modified carrier member 150' may have through-apertures in the form of elongate slots $168'_1$, $168'_2$, . . . may extend to the supporting end 156 of the carrier member such that the spoke regions $170'_1$, $170'_2$, . . . are conjoined only at the attachment end 158 and independently flexible.

It will be appreciated that there are alternative ways of keeping the housing seat free of contaminants. Referring now to FIGS. 2 and 2(a), these show in sectional elevation a second embodiment of ball joint arrangement 210 and cover 240 in accordance with the present invention. The component parts are mainly similar to those of the ball joint arrangement 110 and will not be described again in detail. When identical the same reference numbers are used; when of a corresponding but different form, the reference numbers have the prefix "2". The cover 240 comprises a carrier 244 in the form of unitary carrier member 250 that is the same as the carrier member 150 except that the through-aperture slots $268_1$, $268_2$ . . . or equivalent are open and the carrier means supports housing seal in the form of a housing sealing ring 242 at the supporting end 256 and biased into contact with a face 221 of the housing member surrounding the seat aperture. In this embodiment the housing sealing ring comprises the ball sealing ring which, as seen from FIG. 2(a), is supported with adjacent faces $242_1$ and $242_2$ thereof biased against the spherical surface 118 and housing face 221 respectively. The common ball and housing sealing ring 242 thus forms housing seal which prevent ingress of contaminants to the seat 126. Insofar as this seal is between the seat and the cover region 246 defined by the carrier member, the latter need not be made impervious to contaminants. Consequently the through-apertures, slots $268_1$, $268_2$ . . . , may be left open and unplugged. Likewise there is no need to provide a gasket seal between the attachment end 258 of the carrier member and the housing, although it will be appreciated, the cover region could, if desired, be isolated in the manner described above to give better protection against the ingress of contaminants.

Although each sealing face of the ball sealing ring (and optionally housing sealing ring) is illustrated as conforming to the surface or surfaces abutted, it may have any suitable profile, such as raised lips, that effects sealing between relatively sliding components whether due to pivoting of the ball member or biasing of the carrier member.

It will be appreciated that the carrier means may be defined other than a unitary carrier member, subject to appropriately sealing the cover region 146 with the carrier 144 of cover 140, but without such constraint with the carrier 244 of cover 240, provided of course that both the ball seal and housing seal are formed and operationally disposed with respect to the ball member and housing to perform their respective functions. Although a unitary carrier member is convenient, attachment to and removal from the housing member does require access along the ball member and neither can be effected with the ball joint operatively connected to other components.

Figure 3:
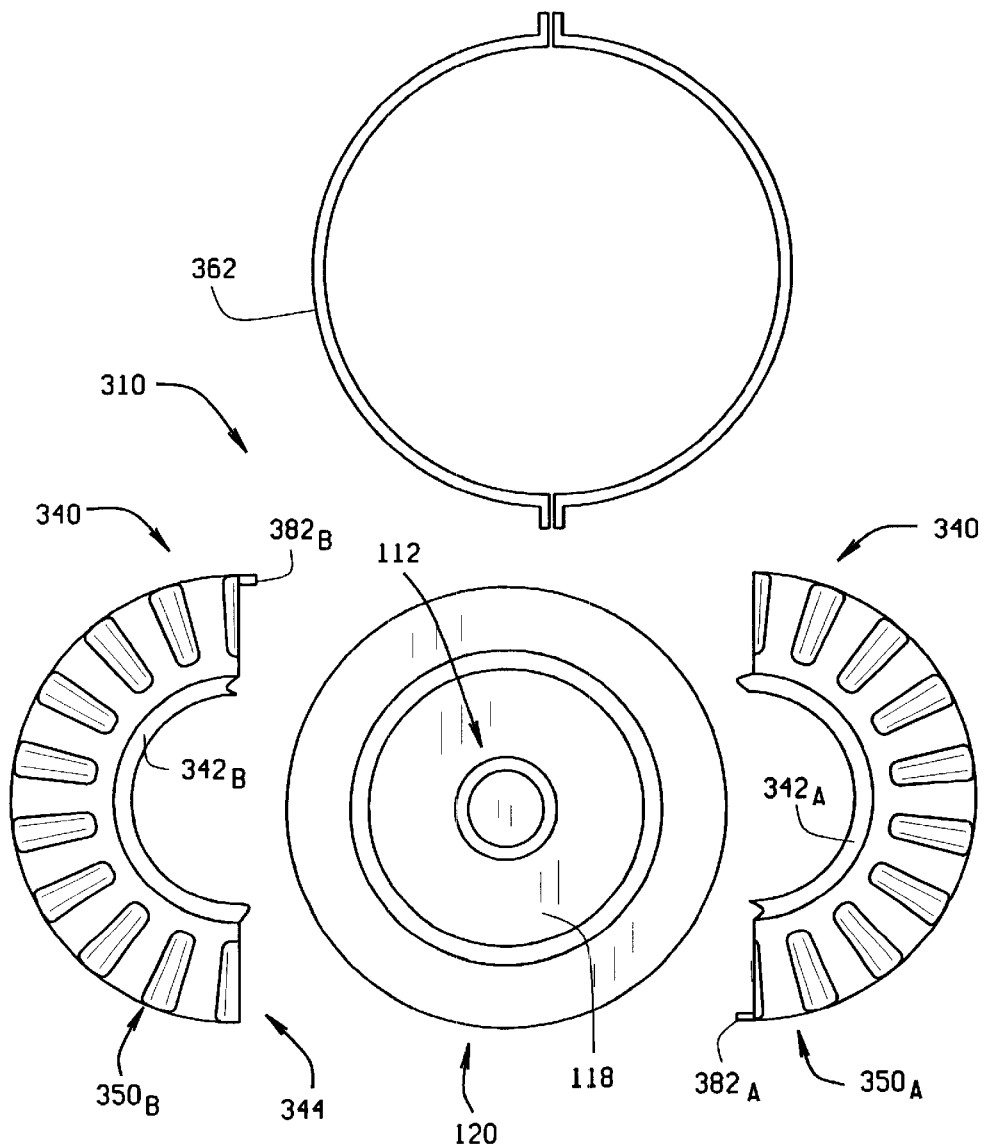
FIG. 3 is a plan view of a ball joint arrangement and cover in accordance with a third embodiment of the present invention, the cover differing from that of FIGS. 1(a) to 1(e) in that it comprises two semi-circular carrier members arranged to be clamped together about the housing member laterally thereof rather than along the axis of the ball member.

Referring now to FIG. 3 this shows in plan view a third embodiment of ball joint arrangement 310 and cover 340 in accordance with the present invention. The component parts are mainly similar to those of the ball joint arrangement 110 and will not be described again in detail. When identical the same reference numbers are used; when of a corresponding but different form, the reference numbers have the prefix "3". The cover 340 comprises carrier 344 that differs from the carrier member 150 in that it consists of two carrier members $350_A$ and $350_B$ in the form of semi-circular segments that are dimensioned to fit around the housing member and abut each other to effect an annular cover. Each member supports a component part of the ball seal $342_A$ and $342_B$ which abut to effect a ball sealing ring and housing seal $382_A$ and $382_B$. The attachment takes the form of a clamping ring 362 which is adapted to surround the attachment ends of the positioned carrier members.

Although the carrier 344 is shown with components carrier members having plugged slots and housing seal at the attachment thereof, it will be understood that the techniques of FIG. 2 of the housing barrier may be employed; that is, the slots may be unplugged and the housing seal provided by the ball sealing ring. Whilst this second embodiment is described and illustrate with two component segments, it will be seen that it may comprise a larger number of equal or non-equal segments.

Referring now to FIG. 4, this shows as a perspective view a fourth embodiment of ball joint arrangement 410 with a cover 440 in accordance with the present invention. Components identical to those in FIG. 3 are given the identical reference numbers, components corresponding to those of that Figure but not identical are prefixed with a "4". Carrier 444 comprises an array of discrete carrier members $450_A$, $450_B$, $450_C$ each of such limited circumferential extent as to correspond to the spoke regions of a unitary carrier member. Each carrier member has a ball (and housing) supporting end 456 and an attachment end 458 which is barbed or otherwise adapted for attachment to the housing member, individually or by a continuous, overlying clamping ring as shown ghosted at 459. The carrier may alternatively have the erstwhile discrete carrier members conjoined at their attachment ends to define a unitary carrier member having the attachment properties thereof but with the functional properties of discrete members.

It will be seen that there are a wide variety of forms that may be taken by the carrier to support a ball sealing member and housing seal ring which provide both a superior ball member pivoting range and the ability to operate disposed adjacent sources of radiant heat, and the above described embodiments are illustrative thereof.

There are instances when pivoting of the ball member relative to the housing is essentially confined to one plane in which movement through a large angular range is required, and a cover in accordance with the present invention is able to provide a ball joint arrangement permitting this.

Figure 5A:
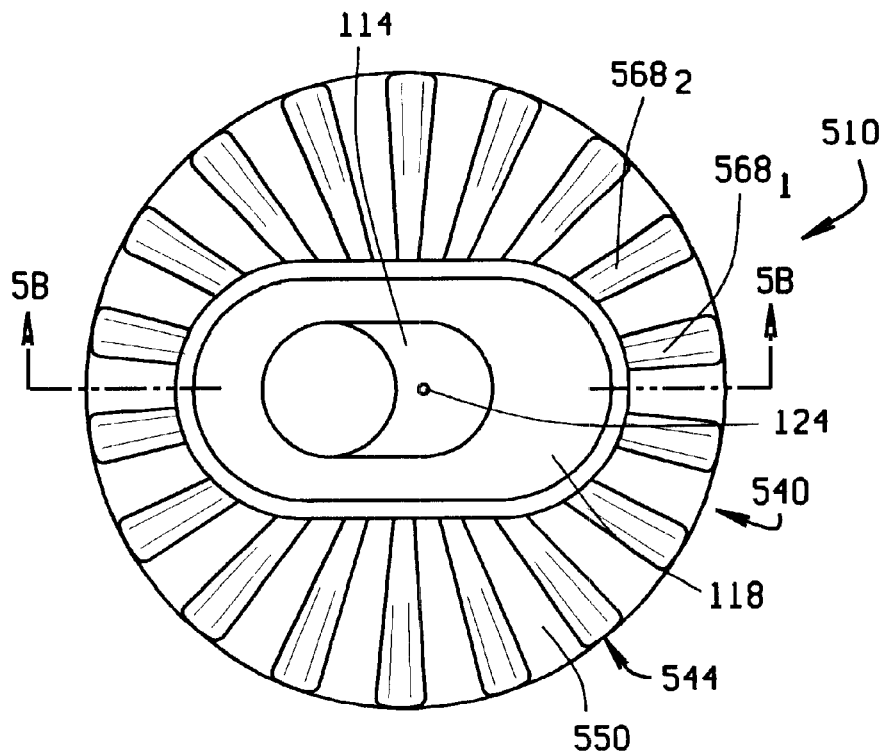
FIG. 5(a) is a plan view of a ball joint arrangement and cover in accordance with a fifth embodiment of the invention wherein a unitary carrier member is shaped to define the locus for the ball sealing ring at varying radial distances from the housing axis and various axial distances from the housing, to facilitate asymmetrical pivoting of the ball member.
Figure 5B:
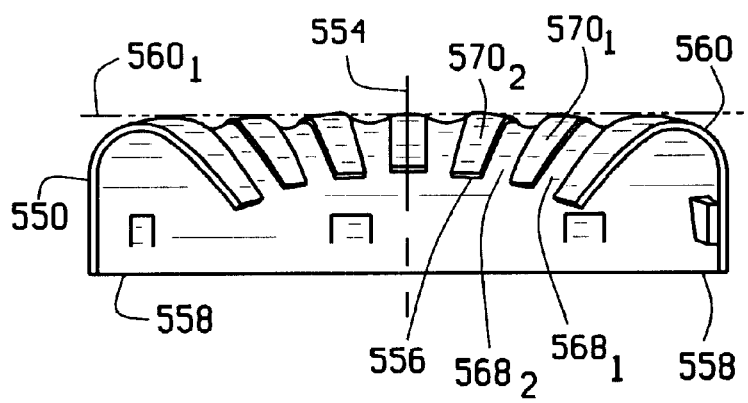
FIG. 5(b) is a sectional elevation through part of the;ball joint arrangement of FIG. 5(a) in the direction 5b—5b.

Referring to FIG. 5(a) this shows a fifth embodiment of ball joint arrangement 510 and a cover 540 in accordance with the invention. Again the housing member and ball member are as described above and given the same reference numbers to avoid unnecessary repetition of description. The Figure is a view along the longitudinal axis 124 of the housing member. The cover 540 comprises a unitary carrier 544 in the form of carrier member 550, also shown in sectional elevation in FIG. 5(b), which is generally similar to the carrier member 150 in having an everted or inturned tubular shape defined about tube axis 554 and, in the longitudinally curved region 560, an array of through-apertures in the form of slots $568_1$, $568_2$, . . . . The slots, however, extend to the supporting end 556 of the member, and define discrete and separately flexible spoke regions $570_1$, $570_2$, . . . conjoined only in the region of attachment end 558. The carrier member differs furthermore in that the radial and axial extent of the individual spoke regions varies as a function of angular position about the tubular axis so that the supporting end 556, defined by the locus of the ends of the spoke regions, is displaced along said tubular axis with respect to the attachment end and radially of the tubular axis as a function of angular position about the tubular axis, two points of maximum axial displacement and minimum radial displacement being 180 degrees from each other and 90 degrees from two points of minimum axial displacement and maximum radial displacement such that the ball member opening is elongated in view along the tubular axis, permitting a particularly large range through which the ball member can be pivoted In one plane.

The carrier member 550 is formed with the longitudinally curved region 560 in a uniform transverse plane $560_1$ at a substantially constant distance from the attachment end 558, with variations in the ball member opening being effected by the spoke regions extending towards the ball member being at different inclinations at the various angular positions about the tubular axis of the carrier member so that at said various angular positions the force exerted locally by the ball sealing ring on the spherical surface is also subject to variation.

Figure 6:
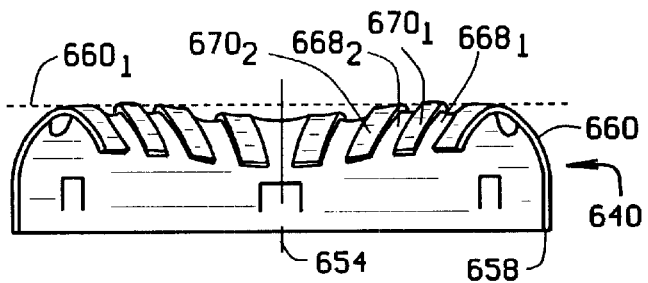
FIG. 6 a sectional elevation, similar to that of FIG. 5(b), through a carrier member of a ball joint arrangement in accordance with a sixth embodiment of the present invention, illustrating an alternative definition of asymmetrical locus of the ball sealing ring.

Referring now to FIG. 6, this shows a sectional elevation thereof a cover 640 of a sixth embodiment in accordance with the present invention in the form of carrier member 650, formed as before in the shape of an everted tubular body. The view in FIG. 6 is at 90 degrees to the view in FIG. 5(b) and it will be seen that the longitudinally curved region 660 varies from a uniform transverse plane $660_1$ as a function of angular position about tubular axis 654 so that spoke regions $670_1$, $670_2$, . . . defined by the slots $668_1$, $668_2$, . . . in the member extend from the longitudinally curved region 660 and, as a matter of choice, at a substantially uniform inclination at all angular positions about the tubular axis, or so as to act on the ball sealing ring supported thereby to bear on the spherical surface of the ball member substantially perpendicular to the surface at all angular positions about the coincident tubular and housing axes, albeit at different axial positions along the axes.

It will be appreciated that the cover means of these fifth and sixth embodiments may be made with plugged slots in the manner of the first embodiment, with combined ball sealing ring and housing sealing ring in the manner of the second embodiment, including optionally unplugged slots, and may be made as a non-unitary, that is, segmented as in the manner of the third embodiment.

In view of the above, it will be seen that the several aspects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. For a ball joint arrangement comprising a ball member, having an end portion that has a spherical curvature facing along the member from the end portion, and a housing member, comprising a container for at least part of the end portion of the ball member and an aperture surrounding a longitudinal axis thereof to permit passage of the uncontained part of the ball member and provide a seat for the spherical surface thereof, a ball joint cover, operable to prevent ingress of contaminants to the seat, comprising:

a ball seal arranged to extend around the longitudinal axis of the housing member as a ball sealing ring;

a carrier adapted to be attached to the housing member operable to support the ball sealing ring biased against the spherical surface of the ball member displaced from the housing, such that said spherical surface can slide relative to the ball sealing ring, and to define a cover region between said carrier and said housing member, said carrier including,
  (a) a supporting end arranged to support said ball sealing ring displaced from the housing member;
  (b) a housing attachment end, adapted to attach the carrier to the housing member; and
  (c) at least one carrier spoke region extending between said supporting end and said housing end; and
  (d) a plurality of through-aperture elements operable to define the resilience of said carrier between said supporting end and said housing attachment end; and a barrier operable to inhibit ingress of contaminants to the seat from the cover region.

2. The ball joint cover as claimed in claim 1 in which said carrier comprises a unitary, annular carrier member.

3. The ball joint cover as claimed in claim 1 in which said carrier has the shape of a tube generated about a tube axis and everted for part of its tubular length such that said supporting end extends inclined with respect to the tube axis and forms the locus of a ball member opening and said housing attachment end extends substantially parallel to said tube axis, said carrier being adapted for attachment to said housing member such that said tube axis extends substantially coincidentally with said longitudinal axis and said supporting end extends substantially orthogonally with respect to said spherical surface of said ball member.

4. The ball joint cover as claimed in claim 3 in which said supporting end of said carrier is inclined with respect to said tube axis in a range of 30 degrees to 60 degrees.

5. The ball joint cover as claimed in claim 4 in which said sealing ring supporting end of said carrier is inclined with respect to said tube axis at substantially 45 degrees.

6. The ball joint cover as claimed in claim 3 in which the ends of said everted tubular shape are connected by a region of longitudinal curvature of substantially constant radius of curvature.

7. For a ball joint arrangement comprising a ball member, having an end portion that has a spherical curvature facing along the member from the end portion, and a housing member, comprising a container for at least part of the end portion of the ball member and an aperture surrounding a longitudinal axis thereof to permit passage of the uncontained part of the ball member and provide a seat for the spherical surface thereof, a ball joint cover, operable to prevent ingress of contaminants to the seat, comprising:

a ball seal arranged to extend around the longitudinal axis of the housing member as a ball sealing ring;

a carrier adapted to be attached to the housing member operable to support the ball sealing ring biased against the spherical surface of the ball member without the housing, such that said surface can slide relative to the sealing ring, and to define a cover region between said carrier and said housing member, said carrier including,
  (a) a supporting end arranged to support said ball sealing ring displaced from the housing member;
  (b) a housing attachment end, adapted to attach the carrier member to the housing member; and
  (c) at least one carrier member spoke region extending between said supporting end and said housing attachment end;

a barrier operable to inhibit ingress of contaminants to the seat from the cover region;

wherein said carrier has the shape of a tube generated about a tube axis and everted for part of its tubular length such that said supporting end extends inclined with respect to the tube axis and forms the locus of a ball member opening and said housing attachment end extends substantially parallel to said tube axis, the supporting end and said housing attachment end of said everted tubular shape are connected by a region of longitudinal curvature of substantially constant radius of curvature having at each of a plurality of positions arrayed about said tubular axis, through-aperture elements operable to define the resilience of said carrier member between said supporting end and said housing attachment end, and wherein said carrier is adapted for attachment to said housing member such that said tube axis extends substantially coincidentally with said longitudinal axis and said supporting end extends substantially orthogonally with respect to said spherical surface of said ball member.

8. The ball joint cover as claimed in claim 7 in which at each said array position the through-aperture elements comprises a slot extending in a direction between said ends of the carrier member body, said array of adjacent slots defining therebetween an array of said spoke regions conjoined at least said attachment end.

9. The ball joint cover as claimed in claim 8 in which said slots are tapered in width as a function of distance between said ends of said carrier member such that said spoke regions between said slots are of substantially of uniform width.

10. The ball joint cover as claimed in claim 8 in which each slot end is defined of constant radius of curvature.

11. The ball joint cover as claimed in claim 8 in which said slots extend to said supporting end of said carrier and said spoke regions are independently deflectable relative to said attachment end.

12. The ball joint cover as claimed in claim 7 in which at least one of said through-apertures is plugged with an elastomeric material.

13. The ball joint cover as claimed in claim 12 in which said elastomeric material is a high temperature elastomer able to withstand exposure to temperatures of at least 140 degrees Celsius.

14. The ball joint cover as claimed in claim 12 in which said elastomeric material is silicone rubber.

15. The ball joint cover as claimed in claim 7 in which the through-aperture elements comprise less than 50% of surface area of said carrier member.

16. The ball joint cover as claimed in claim 12 in which the surface of said at least one plug is arrange to reflect radiant heat incident thereon.

17. The ball joint cover as claimed in claim 7 in which the surface of said at least one carrier member is arranged to reflect radiant heat incident thereon.

18. The ball joint cover as claimed in claim 1 in which said carrier is formed of steel.

19. The ball joint cover as claimed in claim 1 in which said ball seal comprises an annular body defining a ball sealing ring having a slit extending circumferentially thereof and is secured to said carrier by engaging the supporting end of each carrier spoke region into said slit.

20. The ball joint cover as claimed in claim 1 in which the ball seal is moulded onto the supporting end of each carrier spoke region.

21. The ball joint cover as claimed in claim 1 in which said barrier includes a housing seal adapted to be disposed between said carrier and said housing member.

22. The ball joint cover as claimed in claim 21 in which said housing seal comprises a housing sealing ring carried by said carrier at said supporting end and adapted to be biased by said carrier against said housing,member adjacent said seat.

23. The ball joint cover as claimed in claim 22 in which said housing sealing ring is formed of the same material as said ball seal.

24. The ball seal cover as claimed in claim 19 in which said housing seal ring comprises the ball sealing ring.

25. The ball joint cover as claimed in claim 21 which said housing seal comprises a gasket seal disposed at the attachment end of said carrier to effect in operative disposition of said cover with respect to the housing member, a seal between the attachment end and the housing member.

26. The ball joint cover as claimed in claim 25 in which the attachment end of the carrier is arranged for operative disposition surrounding the housing member and the gasket seal.

27. The ball joint cover as claimed in claim 3 in which the ball member opening is defined by the supporting end of the carrier and lies in a plane perpendicular to said tubular axis and at substantially constant radial distance with respect to the tubular axis.

28. For a ball joint arrangement comprising a ball member, having an end portion that has a spherical curvature facing along the member from the end portion, and a housing member, comprising a container for at least part of the end portion of the ball member and an aperture surrounding a longitudinal axis thereof to permit passage of the uncontained part of the ball member and provide a seat for the spherical surface thereof, a ball joint cover, operable to prevent ingress of contaminants to the seat, comprising:

a ball seal arranged to extend around the longitudinal axis of the housing member as a ball sealing ring;

a carrier adapted to be attached to the housing member operable to support the ball sealing ring biased against the spherical surface of the ball member without the from each other and 90 degrees from two points of minimum axial displacement and maximum radial displacement.

29. A ball joint cover for a ball joint arrangement including a ball member, having an end portion that has a spherical curvature facing along the member from the end portion, and a housing member having a container for at least part of the end portion of the ball member and an aperture surrounding a longitudinal axis thereof to permit passage of the uncontained part of the ball member and provide a seat for the spherical surface thereof, comprising:

a ball seal arranged to extend around the longitudinal axis of the housing member as a ball sealing ring;

a carrier adapted to be attached to the housing member operable to support the ball sealing ring biased against the spherical surface of the ball member without the housing, such that said surface can slide relative to the sealing ring, and to define a cover region between said carrier and said housing member, said carrier including a plurality of through-aperture elements operable to define the resilience of said carrier; and a barrier operable to inhibit ingress of contaminants to the seat from the cover region.

30. A ball joint arrangement as claimed in claim 29 in which the housing member has a tubular side wall having therein circumferentially extending recess and the said housing attachment end of said carrier has barbs projecting from the surface thereof and adapted to engage with said recess to inhibit disengagement in a direction from the housing member towards the ball member.

31. A ball joint arrangement as claimed in claim 29 in which the spherical surface of the ball member is provided with a corrosion inhibiting coating or corrosion inhibiting surface modification.

* * * * *

UNITED STATES PATENT AND TRADEMARK OFFICE
CERTIFICATE OF CORRECTION

PATENT NO.    : 6,439,795 B1                                          Page 1 of 1
DATED         : August 27, 2002
INVENTOR(S)   : Gillian Lavery et al.

It is certified that error appears in the above-identified patent and that said Letters Patent is hereby corrected as shown below:

<u>Title page,</u>
Item [73], Assignee, reads "...Federal-Mogul Technology Limited, Rugby (GB)..." should read -- Federal-Mogul World Wide, Inc., Southfield, Michigan --

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,439,795 B1
DATED : August 27, 2002
INVENTOR(S) : Gillian Lavery et al.

It is certified that error appears in the above-identified patent and that said Letters Patent is hereby corrected as shown below:

Column 14,
Line 5, after "without the", insert:
-- housing, such that said surface can slide relative to the sealing ring, and to define a cover region between said carrier and said housing member, said carrier including,
    (a)    a supporting end arranged to support said ball sealing ring displaced from the housing member;
    (b)    a housing attachment end, adapted to attach the carrier member to the housing member; and
    (c)    at least one carrier member spoke region extending between said supporting end and said housing attachment end;
a barrier operable to inhibit ingress of contaminants to the seat from the cover region;
wherein said carrier has the shape of a tube generated about a tube axis and everted for part of its tubular length such that said supporting end extends inclined with respect to the tube axis and forms the locus of a ball member opening and said housing attachment end extends substantially parallel to said tube axis, said carrier being adapted for attachment to said housing member such that said tube axis extends substantially coincidentally with said longitudinal axis and said supporting end extends substantially orthogonally with respect to said spherical surface of said ball member;
and wherein said supporting end of the carrier surrounding the ball member opening is displaced along said tubular axis with respect to the attachment end and radially of the tubular axis as a function of angular position about the tubular axis, two points of maximum axial displacement and minimum radial displacement being 180 degrees --

Signed and Sealed this

Twenty-second Day of July, 2003

JAMES E. ROGAN
*Director of the United States Patent and Trademark Office*